United States Patent [19]

Baydar et al.

[11] Patent Number: 5,214,651
[45] Date of Patent: May 25, 1993

[54] SONET TRANSMIT SIGNALING TRANSLATOR

[75] Inventors: Ertugrul Baydar; Timothy J. Williams, both of Raleigh, N.C.

[73] Assignee: Alcatel Network Systems, Inc., Richardson, Tex.

[21] Appl. No.: 350,717

[22] Filed: May 11, 1989

[51] Int. Cl.$^5$ .............................. H04J 3/12; H04J 3/24
[52] U.S. Cl. ................................ 370/110.1; 370/94.1; 370/84; 370/94.2
[58] Field of Search ................... 370/110.1, 58.1, 58.2, 370/58.3, 60, 60.1, 94.1, 94.2, 94.3, 1, 84

[56] References Cited

U.S. PATENT DOCUMENTS 4,967,405 10/1990 Upp et al. .......................... 370/58.1

FOREIGN PATENT DOCUMENTS 0305992 8/1989 Japan .

OTHER PUBLICATIONS

Proceedings IEEE Global Telecommunications Conference, Tokyo 15.-18. Nov. 1987, vol. 1, New York, US, pp. 485-489; N. B. Sandesara et al.: "Synchronous Optical Network Format and Terminal Applications".
Proceedings IEEE Global Telecommunications Conference, Hollywood, Fla., 28, Nov.-1, Dec. 1988, vol. 2, New York, US, pp. 980-986; N. B. Sandesara et al.: "Sonet Intra-Office Interconnect Signal".

Primary Examiner—Douglas W. Olms
Assistant Examiner—Wellington Chin
Attorney, Agent, or Firm—Ware, Fressola, Van Der Sluys & Adolphson

[57] ABSTRACT

In a SONET-access product, channel-associated signaling is rearranged into SONET-formatted signaling, with the signaling for added channels being multiplexed with the signaling for through channels, in accordance with a control signal received from a channel map RAM, which stores one bit of data for each channel to indicated whether it is a through channel or an add channel. The RAM is provisioned by a network control processor.

13 Claims, 12 Drawing Sheets

| FIG. 8A | FIG. 8B |

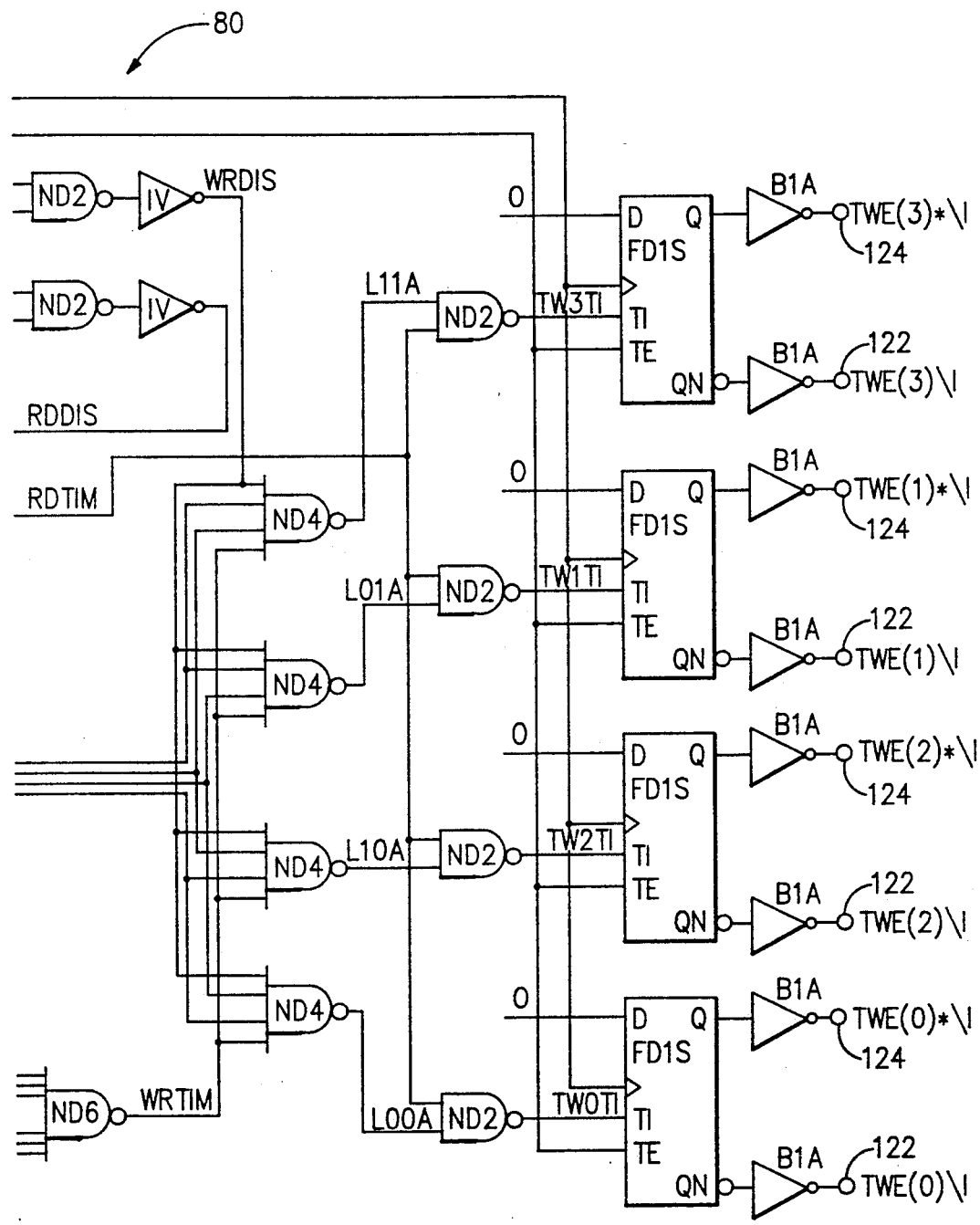
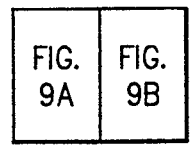
FIG.9B
FIG.9

SONET TRANSMIT SIGNALING TRANSLATOR

BACKGROUND OF THE INVENTION

1. Field of the Invention

The present invention relates to telephone signaling, and more particularly, to a device for translating channel-associated signaling, of the type wherein the signaling bits for each data channel are associated with each other and with their corresponding data, into SONET-formatted signaling.

2. Description of the Prior Art

The American National Standard Institute, Inc. (ANSI) T1.105-1988 describes the Synchronous Optical Network (SONET) protocol for telecommunications equipment. This standard is incorporated herein by reference. The SONET protocol is particularly adapted for optical transmission, and various transmission levels have been standardized at specified line rates in M bit/s. The first level, Optical Carrier Level 1, or OC-1, transmits data at the rate of 51.84 M bits/s. This carrier level has a corresponding electrical level called Synchronous Transport Signal Level 1, or STS-1.

In order to access this high-frequency carrier level, access products are required so that lower bandwidth carriers can be introduced into or extracted from the STS-1 transmission level. These access products provide a SONET network with nodes where components of an STS-1 signal can be added to or dropped out of the main signal. The components that are extracted must be reorganized to produce a signaling format compatible with currently-used telephone standards. In like manner, components that are added must have their signaling reorganized for insertion into the SONET format. A typical sub-component of an STS-1 signal would be a DS1 signal having a bit rate of 1.544 M bits/s. Twenty-eight DS1 signals can be supported by an STS-1 carrier. Within the DS1 signal format, an additional 24 DS0 64 K bits/s signals can be supported.

The SONET transmission is serial, comprising a total of 810 bytes. The frame structure for an STS-1 is shown in FIG. 1. The frame comprises 90 columns×9 rows of bytes, with 8 bits per byte. The sequence of transmission of the bytes is row by row, from left to right. The frame is divided into three parts: the section and line overhead, which are contained in the first three columns; and the payload, which is found in the 87 remaining columns, which, in connection with the nine rows, forms a Synchronous Payload Envelope, SPE, which includes 783 bytes. Nine of the SPE bytes are allocated to path overhead. The SPE can begin anywhere within the 87×9 byte envelope. Typically, the SPE begins in one SONET frame and ends in another. A payload pointer provided in overhead bytes H1 and H2 points to the byte where the SPE begins, shown as P=0 in FIG. 1. The information within the SPE is transported in Sub-STS-1 payloads called Virtual Tributaries, or VTs. There are several levels of VTs; however, it is only necessary to deal with a VT 1.5 for purposes of describing this invention. When the STS-1 payload supports 28 DS1 services, one VT at the 1.5 level is provided for each DS1 service.

FIG. 2 illustrates the payload mapping of SONET bytes into a DS1.

An SPE consists of 783 bytes belonging to 28 tributaries, wherein each tributary can carry a DS1 payload, as illustrated in FIG. 2. A DS1 payload has 27 bytes, 24 of which carry DS0 channels. The first byte carries a VT pointer, or address; a second byte is unused; and the third byte carries signaling data for the DS1 payload. Every channel has four signaling bits, namely, A, B, C and D, as is well known in the telephony art. Thus, for a DS1 payload of 24 channels, a total of 96 signaling bits are required. Since only four bits of signaling are carried in each SONET signaling byte and there is only one signaling byte per tributary or DS1, a total of 24 SONET frames would be required in order to transmit the 96 required signaling bits.

FIG. 3 illustrates the transmission order of the payload contained within the SPEs of 24 SONET frames. For the sake of clarity, a number of bytes of the SPE are now shown in FIG. 3. These bytes include: the first two rows of each SPE, which would contain bytes 1 and 2 of each of the 28 tributaries, as shown in FIG. 2, the nine path overhead bytes, and additional 'fixed stuff' bytes. In addition, the SPE has been shown as being located entirely within one SONET frame. This facilitates the illustration in FIG. 3 of the signaling bits provided in each SPE byte. Thus, the first row of each frame shown in FIG. 3 is the signaling row and contains byte number 3 for each of the tributaries. The transmission order proceeds from left to right in each descending row of a frame. Thus, bytes containing four signaling bits for tributaries 0–27 are transmitted in sequence, after which the data for channels 0 for each tributary is transmitted, followed by the data for the other channels through to the transmission of the data for channels 23.

Due to the presence of nine overhead bytes (not shown), bytes 1 and 2 of each tributary, and additional unused 'fixed stuff' bytes in the SPE, the signaling bytes start with SPE byte 60 and continue through byte 87. The content of each SONET signaling byte is as follows:

|  | (MSB) |  |  |  |  |  |  | (LSB) |
|---|---|---|---|---|---|---|---|---|
| Bit No. | 7 | 6 | 5 | 4 | 3 | 2 | 1 | 0 |
| Byte Sync | R | R | S1 | S2 | S3 | S4 | F | R |
| Bit Sync | 1 | 0 | R | R | R | R | F | R |

R bits are not used

In the above, S1, S2, S3 and S4 are the signaling bits corresponding to the sets of four bits shown in the signaling bytes in FIG. 3. Thus, the signaling bits transmitted in the SONET signaling rows of sequential frames are transmitted in the order of all A bits, all B bits, all C bits and all D bits, which bits are not associated with their corresponding channel data and the A, B, C and D bits from a channel are not associated with each other.

Commonly used telephony signaling systems include systems wherein the signaling bits are transmitted in-band within the channel data, and other systems transmit the signaling bits in separate signaling channels. However, in most cases the signaling bits for a channel are associated with each other or are transmitted in association with the channel data. Thus, a system was required which could extract the signaling information from lower-level telephone transmission lines and reassemble the signaling bits into a format which would facilitate insertion of the bits into the SONET format shown in FIG. 3. A total of 2,688 signaling bits must be transmitted on the SONET STS-1 carrier, and these bits must be accumulated from the 24 channels of each of the 28 DS1 carriers supported by the STS-1 transmission level, with each channel having A, B, C and D signaling bits. There are no known solutions to the problem of translating signaling data from the standard signaling formats into the SONET format.

In the system for which this invention was designed, a 16-bit internal byte was used for each channel, with each bit being provided on a separate line of a parallel bus. Thus, for each clock pulse a complete byte of channel information was obtained. The internal signaling format for a 16-bit byte is compared to a SONET data byte as follows:

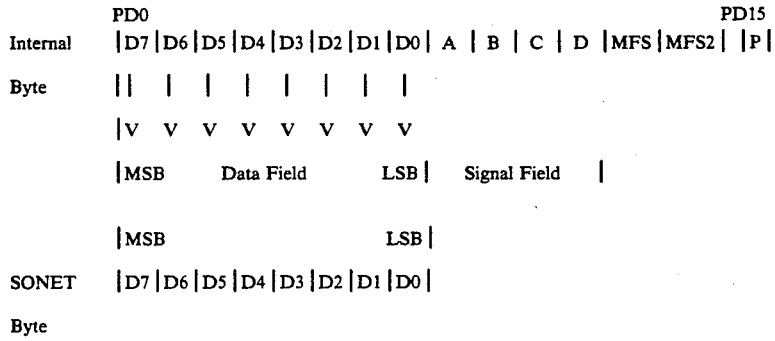

It is to be noted that the internal byte includes a full eight bits of data, which bits are directly transferable to a SONET data byte. The signaling bits A, B, C and D are located out of the data band and therefore do not deteriorate the transmitted data.

The STS-1 SONET format handles 672 data channels, each with ABCD signaling, for a total of 2,688 signaling bits. These bits are available in every internal 125 u sec frame time and are provided in the four outband bit positions. These signaling bits, provided in the same byte as the internal data, must be extracted from the internal byte and rearranged for insertion into the SONET format.

The access products used to extract and add sub-components to the STS-1 transmission level include both an add-drop multiplexer and a terminal multiplexer. The terminal multiplexer receives and extracts all data from the STS-1 and inserts new data in a return path. The add-drop multiplexer, however, poses special problems, since it facilitates the extraction and/or addition of any number of channels carried on the STS-1 line. Thus, some channels pass directly through an add-drop multiplexer, while some channels are extracted and other channels are added. All received channel signaling is converted to the internal format. Thus, the through channels could be treated similarly to the add channels by reconstructing the SONET signaling format from the outband signals provided in the internal format. However, this would cause unnecessary delay for through channels, as the signaling is processed by the access product. Preferably this delay should be avoided by passing each tributary signaling byte through the multiplexer and only overwriting the signaling bits that are being added.

SUMMARY OF THE INVENTION

The present invention contemplates a signaling translator that translates telephone signaling provided as channel-associated signaling to a signaling format for use in 8-bit SONET bytes. An internal 16-bit byte format makes four signaling bits available in each channel (DS0) time slot. In every internal 125 used frame, 2,688 signaling bits are available, but only 112 are needed for insertion into the SONET frame.

In a terminal multiplexer application, signaling bits are provided for each signaling byte of the SONET frame. In an add-drop multiplexer, only signaling bits for channels added to the SONET transmission line are inserted, while the signaling bits for other channels are passed through the multiplexer. Thus, signaling bits for through channels merely pass through the translator, while signaling bits for added channels are multiplexed with the through channels to provide the signaling bits for a SONET frame.

A memory provisioned by a network control processor stores one bit for each channel to provide an indication as to whether the channel is an add channel or a through channel. This memory is addressed for controlling the multiplexer, which selects the signaling for the through channels or the signaling for the add channels.

In each frame period selected outband signal bits are shifted into four shift registers for providing four output bits in the SONET format. These output bits are multiplexed with the through signal bits of the SONET byte to provide an output for insertion into the appropriate SONET signaling bytes.

A primary objective of the present invention is to provide a signaling translator for a SONET STS-1 transmission interface.

Another objective of the present invention is to provide a device which rearranges channel-associated signaling into a SONET format for insertion into a SONET frame.

Another objective of the present invention is to provide a SONET access product which passes channel signaling through the product while multiplexing in signaling relating to channels added by the access product.

Another objective of the present invention is to provide a signaling translator that is useful in both add-drop multiplexer and terminal multiplexer access products.

Another objective of the present invention is to provide a signaling translator that is provisionable by a processor to pass the signaling for selected channels through the translator, while multiplexing in signaling for other channels.

Another objective of the present invention is to provide a signaling translator that passes signaling of through channels through the access product without delay.

DESCRIPTION OF THE DRAWINGS

FIG. 3, comprising

FIG. 9, comprising FIGS. 9A and 9B, is a schematic diagram of a signal memory decoder circuit.

DESCRIPTION OF THE INVENTION

Figure 4:
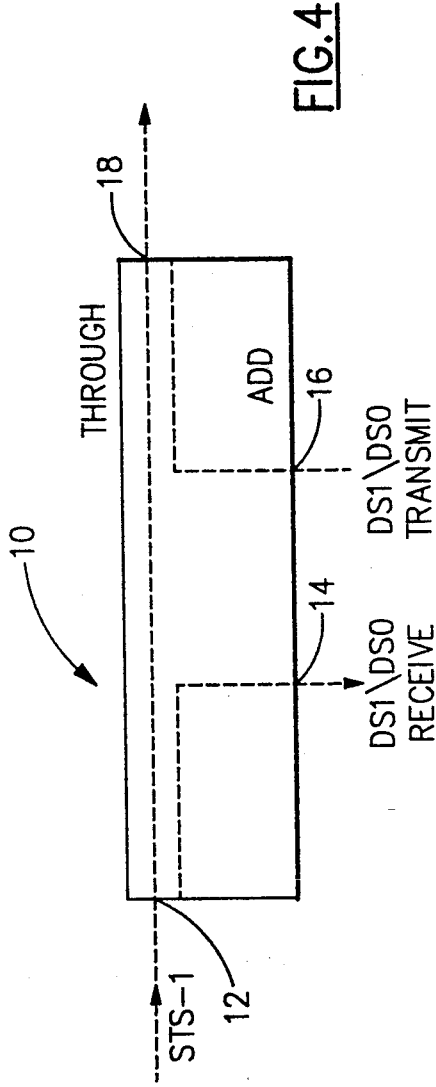
FIG. 4 shows schematically the operation of an add-drop multiplexer.

FIG. 4 shows schematically the function of an add-drop multiplexer 10, wherein an STS-1 level transmission is received at an input 12 in the SONET format, while the sub-components contained therein are provided at an output 14 for connection to DS1/DS0 interface circuitry. Channels to be added to the STS-1 SONET transmission are provided at an input 16 in a DS1/DS0 format. The SONET frame is passed through the add-drop multiplexer to an output 18, where the added channels provided at input 16 are multiplexed with the SONET channels so that the added channels replace the channels of the received SONET frame. In a terminal multiplexer all channels are provided to output 14, and all channels are provided to input 16, and no channels pass through from input 12 to output 18.

Figure 1:
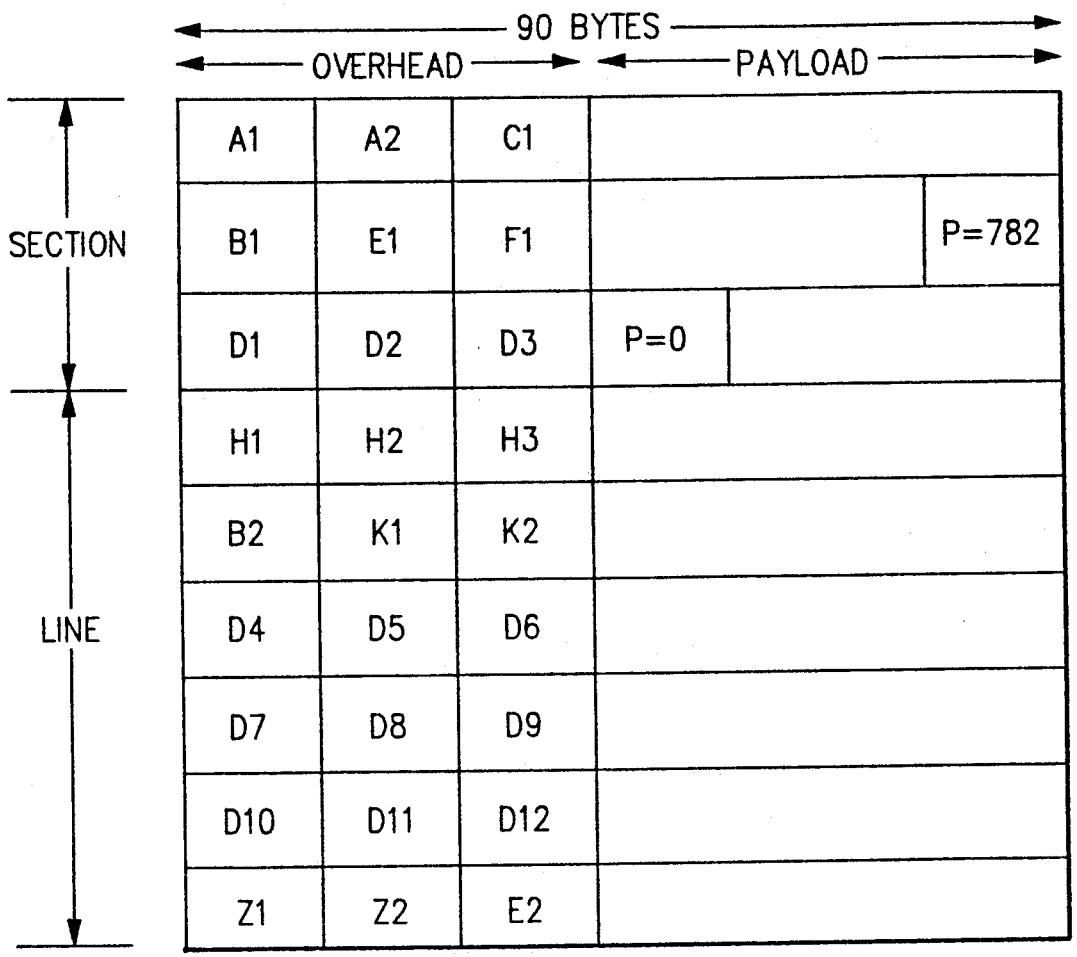
FIG. 1 shows the format of an STS-1 SONET frame.
Figure 2:
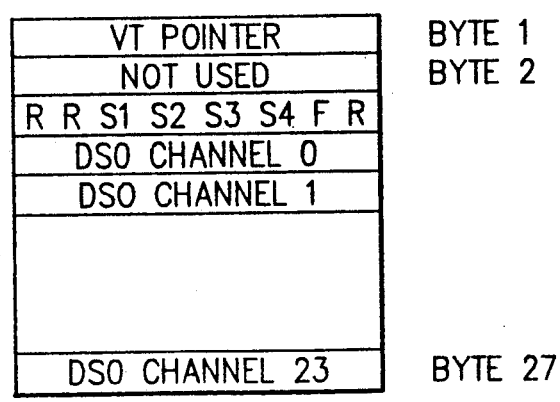
FIG. 2 shows the payload mapping of the DS1 transmission line.
Figure 3A:
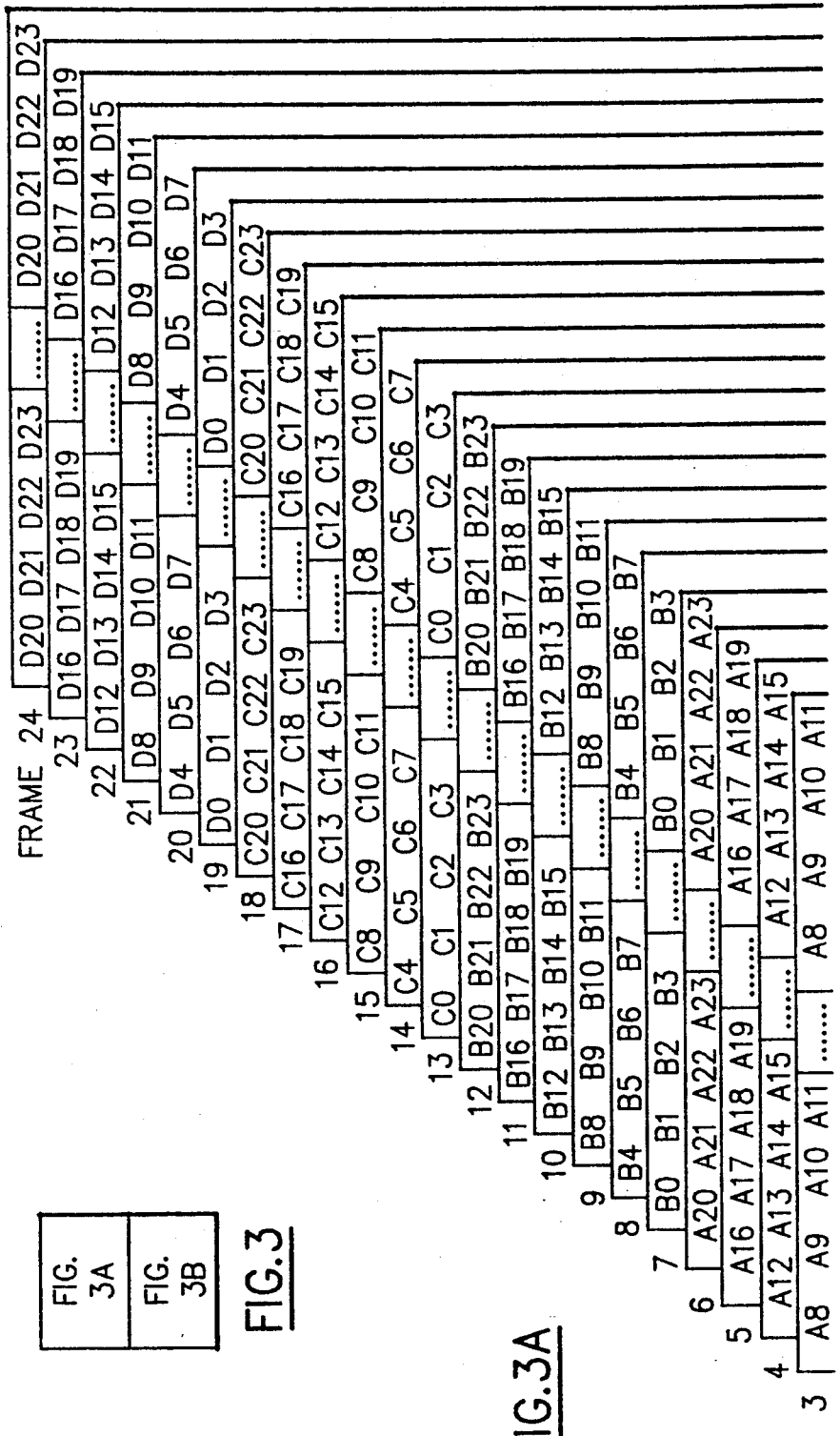
FIGS. 3A and 3B, shows a portion of a SONET Synchronous Payload Envelope (SPE) and the relationship of signal bits to sequential SONET frames.
Figure 3B:
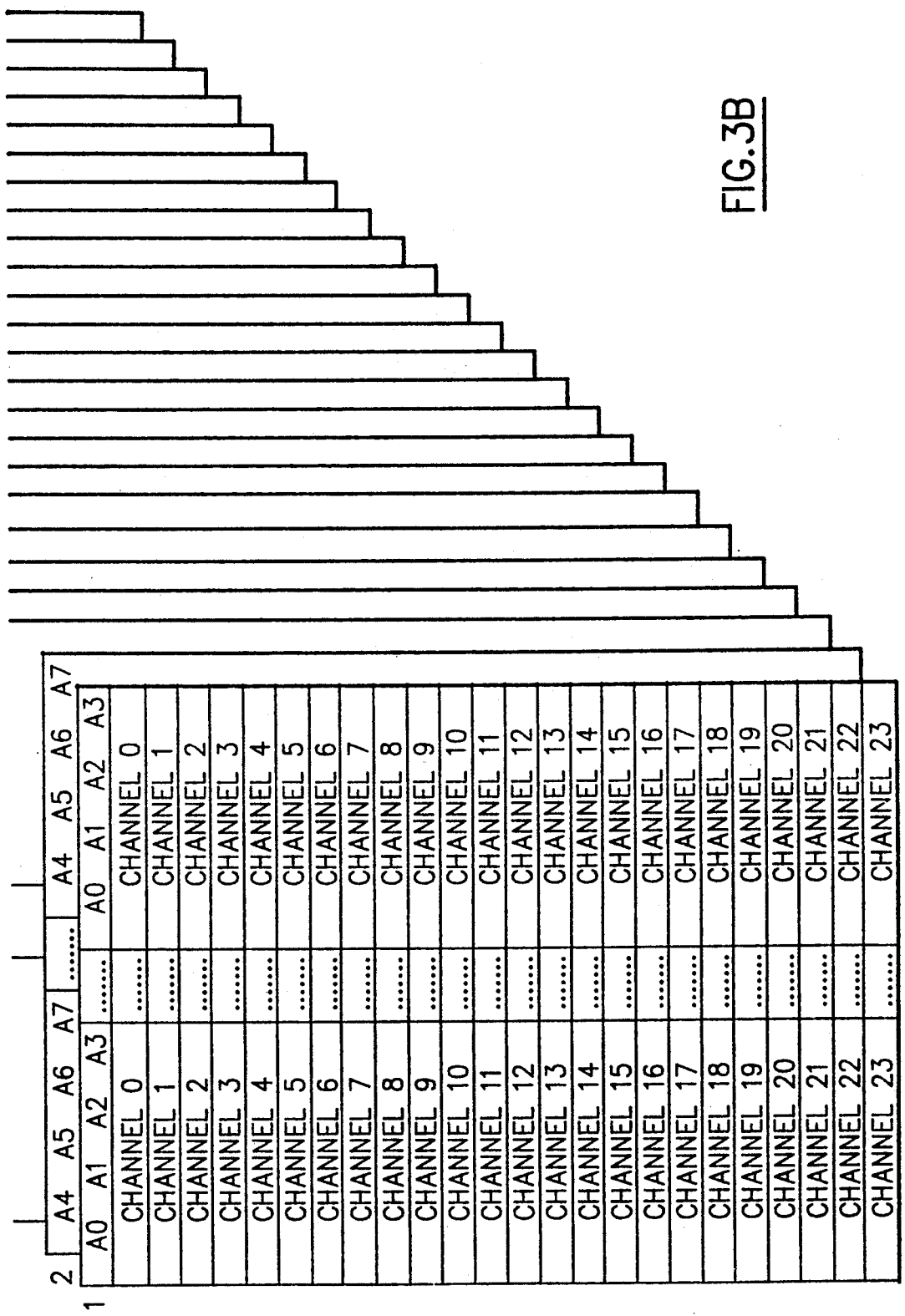
Figure 5:
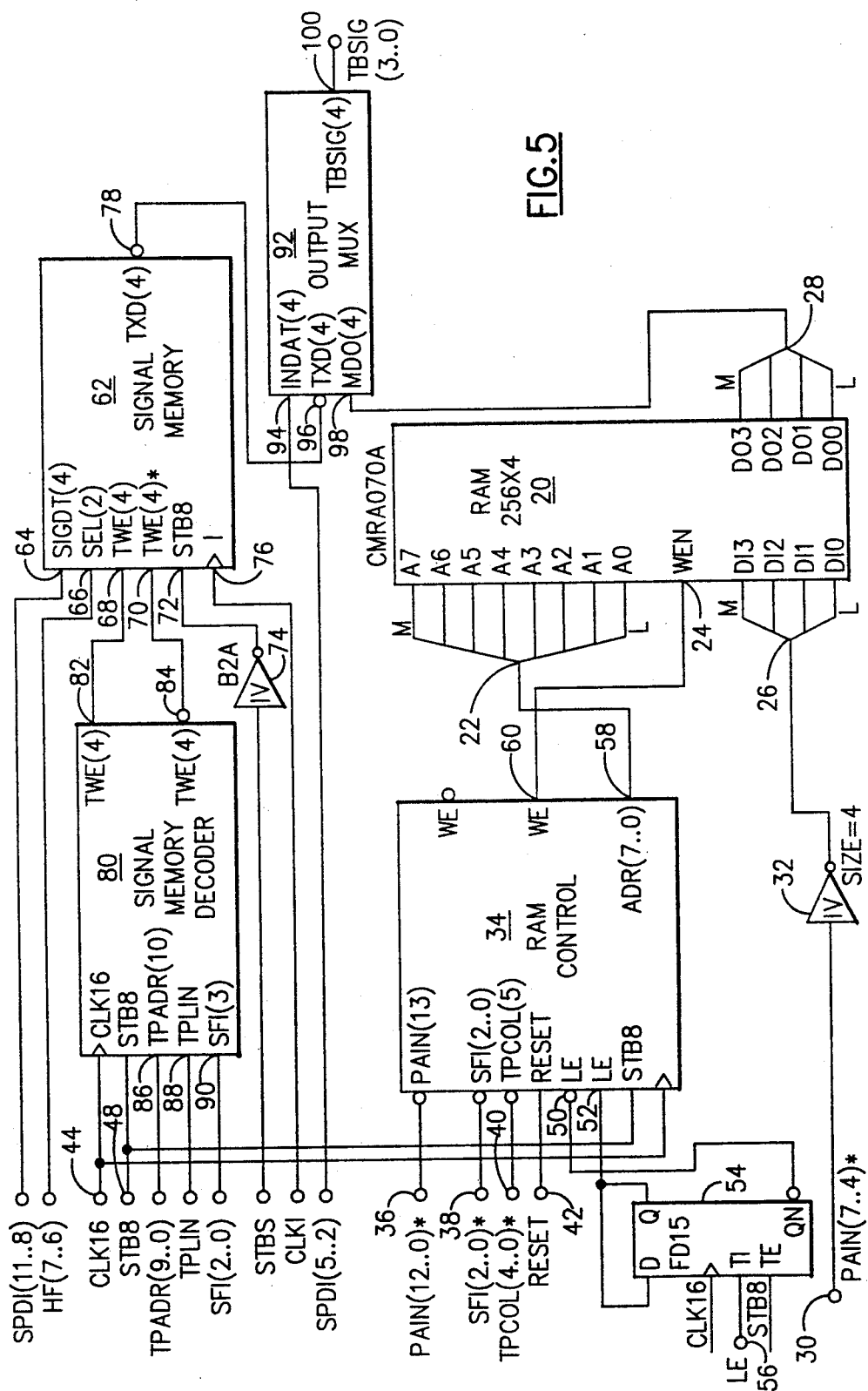
FIG. 5 is a block diagram showing the signaling translator of the present invention.

FIG. 5 shows a block diagram of the signaling translator for mapping signaling contained in the channels added at input 16 of FIG. 4 into the signaling of SONET frames received at input 12. The STS-1 transmission is formatted in frames as shown in FIG. 1. The SPE of the SONET frames is arranged in part as shown in FIG. 3. The added channels provided at input 16 of FIG. 4 are formatted as 16-bit words.

In a terminal multiplexer, all channels are provided at input 16 and thus in a single internal frame period of 125 used, 2688 signaling bytes are made available, of which 112 are selected to be inserted in each signaling row of the SONET format outputted at 18.

The signaling translator shown in FIG. 5 comprises a random access memory (RAM) 20 which is organized as a 256×4 bit memory, of which 192 locations are used to store 672 bits of data, one bit for each channel transmitted at the STS-1 level. RAM 20 includes eight address inputs connected to an address bus 22, a write-enable input 24, four data inputs connected to a data bus 26, and four data outputs connected to an output bus 28. The content of RAM 20 is shown in Table 1, which illustrates how 168 RAM addresses are used to store a total of 672 bits, one for each channel. The logic level of any bit indicates whether the channel is added or passed through.

TABLE 1

| CHANNEL MAP RAM CONFIGURATION | | |
| --- | --- | --- |
| Address | D3-D0 | Tributary No |
| 0 | ch3-ch0 | 0 |
| 1 | ch3-ch0 | 1 |

TABLE 1-continued

| CHANNEL MAP RAM CONFIGURATION | | |
| --- | --- | --- |
| Address | D3-D0 | Tributary No |
| 2 | ch3-ch0 | 2 |
| 3 | ch3-ch0 | 3 |
| 4 | ch3-ch0 | 4 |
| 5 | ch3-ch0 | 5 |
| 6 | ch3-ch0 | 6 |
| 7 | ch3-ch0 | 7 |
| 8 | ch3-ch0 | 8 |
| 9 | ch3-ch0 | 9 |
| 10 | ch3-ch0 | 10 |
| 11 | ch3-ch0 | 11 |
| 12 | ch3-ch0 | 12 |
| 13 | ch3-ch0 | 13 |
| 14 | ch3-ch0 | 14 |
| 15 | ch3-ch0 | 15 |
| 16 | ch3-ch0 | 16 |
| 17 | ch3-ch0 | 17 |
| 18 | ch3-ch0 | 18 |
| 19 | ch3-ch0 | 19 |
| 20 | ch3-ch0 | 20 |
| 21 | ch3-ch0 | 21 |
| 22 | ch3-ch0 | 22 |
| 23 | ch3-ch0 | 23 |
| 24 | ch3-ch0 | 24 |
| 25 | ch3-ch0 | 25 |
| 26 | ch3-ch0 | 26 |
| 27 | ch3-ch0 | 27 |
| 28-31 | not used | |
| 32-59 | ch7-ch4 | 0-27 |
| 60-63 | not used | |
| 64-91 | ch11-ch8 | 0-27 |
| 92-95 | not used | |
| 96-123 | ch15-ch12 | 0-27 |
| 124-127 | not used | |
| 128-155 | ch19-ch16 | 0-27 |
| 156-159 | not used | |
| 160-187 | ch23-ch20 | 0-27 |
| 188-255 | not used | |

RAM 20 is loaded from a network control processor (not shown) depending upon the system configuration which dictates which channels are added by the multiplexer 10. The RAM is initialized to be configured for a terminal multiplexer (all channels being added) after power up. The data to be written into the memory is provided at an input 30 and includes four inverted bits, namely bits 4-7, of a 13-bit parallel bus the data for which is derived from the network control processor provisioning circuitry. An inverter 32 is connected between input 30 and bus 26 for inverting each of the received bits so that non-inverted bits are written into memory. Due to the data path restrictions between the memory and the network control processor, the memory map can only be updated by four bits per frame.

A RAM control circuit 34 receives from a terminal 36 thirteen inverted bits of control information from the network control processor. Other inputs to RAM control circuit 34 include the three least significant inverted bits, namely bits 0, 4 and 5, of the H4 SONET path overhead byte, which bits are provided on terminal 38. Five inverted address bits are provided on terminal 40. These bits are bits 5-9 of a ten-bit address representing the byte number of the SPE that is currently being transmitted. The address bits are synchronized to the payload pointer, which identifies the first SPE byte. A reset signal is provided on terminal 42. Terminals 44 and 48 receive 16 MHz and 8 MHz clock signals respectively. Inputs 50 and 52 of the RAM control circuit 34 are connected to outputs of a flip-flop 54, which is connected to receive the 16 MHz and 8 MHz clocks which were connected to terminals 44 and 48 respectively. Flip-flop 54 also receives from a terminal 56 a write-enable signal (LE) which is derived from two sequential overhead bytes in the SONET frame. The RAM control circuit 34 has an address output 58 for providing eight address bits to bus 22 connected to RAM 20. Output 60 of RAM control circuit 34 provides the write-enable signal which is connected to input 24 of RAM 20.

A signal memory 62 is provided for storing signaling bits prior to multiplexing the stored bits into the SONET format. Signal memory 62 has an input 64 connected to receive on four parallel lines the A, B, C and D signaling bits from the internal 16-bit byte where the signaling bits are in the same byte as the channel data. The signaling bits are bits 8-11, shown heretofore in the internal byte. An input 66 is connected to receive the two most significant bits, namely bits 6 and 7, of the H4 path overhead byte. Input 68 receives four timed write-enable signals, while input 70 receives the inverse of the same four write-enable signals. Input 72 receives an inverted 8 MHz clock signal through an inverter 74, while input 76 receives an inverted 16 MHz clock signal. The signal memory 62 provides a four-bit output at 78 to a four-bit bus.

A signal memory decoder 80 is provided for generating control signals for the signal memory 62, which control signals are provided on outputs 82 and 84. Output 82 provides four timed write-enable signals, while output 84 provides the inverse of the signals provided at output 82. The signal memory decoder receives a 16 MHz clock signal from terminal 44 and an 8 MHz clock signal from input 48. An input 86 receives ten address bits corresponding to the payload byte address of the SPE. The inverted address bits on terminal 40 are derived from bits 5-9 of these address bits. An input 88 receives a payload indicator signal, which is a single byte that is maintained at a high level during the SPE. Input 90 receives three bits corresponding to the least significant bits of the H4 byte of the path overhead, which bytes are numbered 0, 4 and 5.

An output multiplexer 92 is provided for multiplexing the signal bits stored in the signal memory 62, with the signal bits of the SONET channels which are passing through the add-drop multiplexer. An input 94 is connected to receive the four signaling bits, namely, bits 2-5 of the SONET signaling bytes of the SONET frames shown in FIG. 3. Input 96 is connected to output 78 of the signal memory for receiving signaling bits stored therein. An input 98 is connected to the bus 28 at the output of the RAM 20 for receiving control signals for the output multiplexer 92. Output multiplexer 92 has an output 100 which provides four parallel signaling bits for insertion into the signaling row of the SPE, as shown in FIG. 3.

Figure 6:
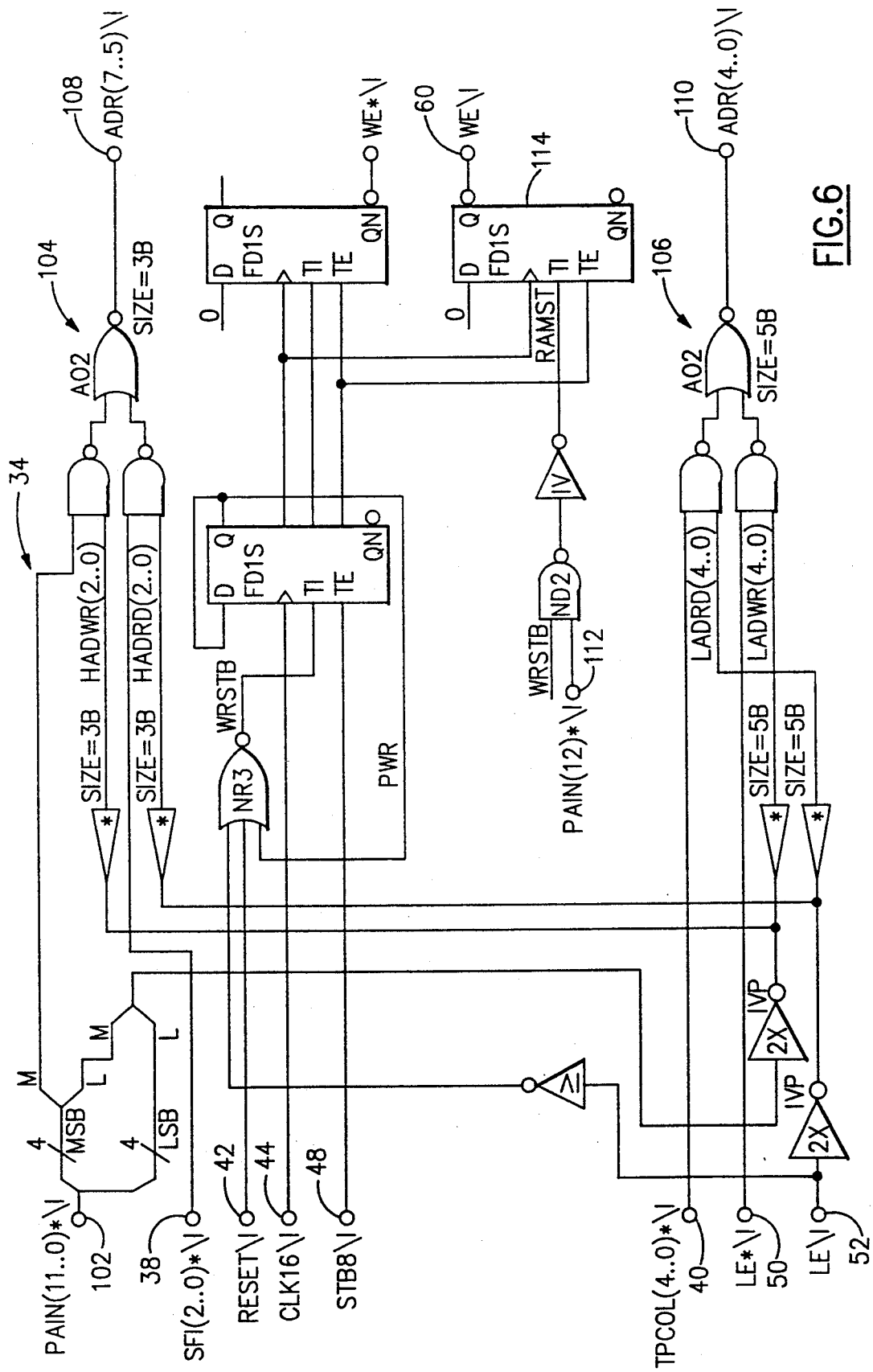
FIG. 6 is a schematic diagram of a random access memory (RAM) control circuit.

Referring to FIG. 6, there is shown a schematic diagram of the RAM control circuit 34. An input 102 is connected to terminal 36 shown in FIG. 5 for receiving bits 0-11 from the network control processor, which bits identify addresses of channels which are to be added by the add-drop multiplexer in accordance with the desired system configuration. The received bits are divided so that the three most significant bits, namely bits 9, 10 and 11, are directed to a gate arrangement 104 which functions as a multiplexer. The four least significant bits, namely bits 0, 1, 2 and 3, and bit 8 are directed towards an input of a gate arrangement 106 which also functions as a multiplexer. These signals provide write addresses for RAM 20. The signals provided at input 38 function as read address signals for the most significant address bits provided to RAM 20. These address signals identify the frame of the STS-1 transmission that is to be written to.

Input 40 provides read address bits to multiplexer 106, said bits correspond to the particular payload column in the SPE. Inputs 50 and 52 provide control bits for indicating when the write and read functions should be performed in RAM 20. In response to these bits, the multiplexers 104 and 106 output either write or read address bits to output terminals 108 and 110 for providing respectively the most significant and the least significant bits for the address to RAM 20. Outputs 108 and 110 are connected to output 58 shown in FIG. 5. An input 112 is connected to terminal 36 shown in FIG. 5 for receiving bit 12 from the network control processor, which bit provides an additional write signal for controlling the writing to RAM 20. This write signal is clocked through a flip-flop 114 for providing a write-strobe at output 60 for enabling the writing to RAM 20 of new add channels for the add-drop multiplexer. During the signaling row of the SPE, the read addresses are provided by multiplexers 104 and 106 so that the appropriate data may be read from RAM 20 to control the output multiplexer 92 and add the signaling for add channels to the SONET signaling.

Thus, the data within RAM 20 is updated four bits per frame during specific write times, in accordance with address signals received from RAM controller 34 and write-enable signal LE received from the frame address counter from terminal 56. The address multiplexers 104 and 106 output the write addresses during four clock periods, while the write strobe is generated in the third of the four clock periods. The read addresses are outputted when the signaling row of the SPE is transmitted.

Figure 7:
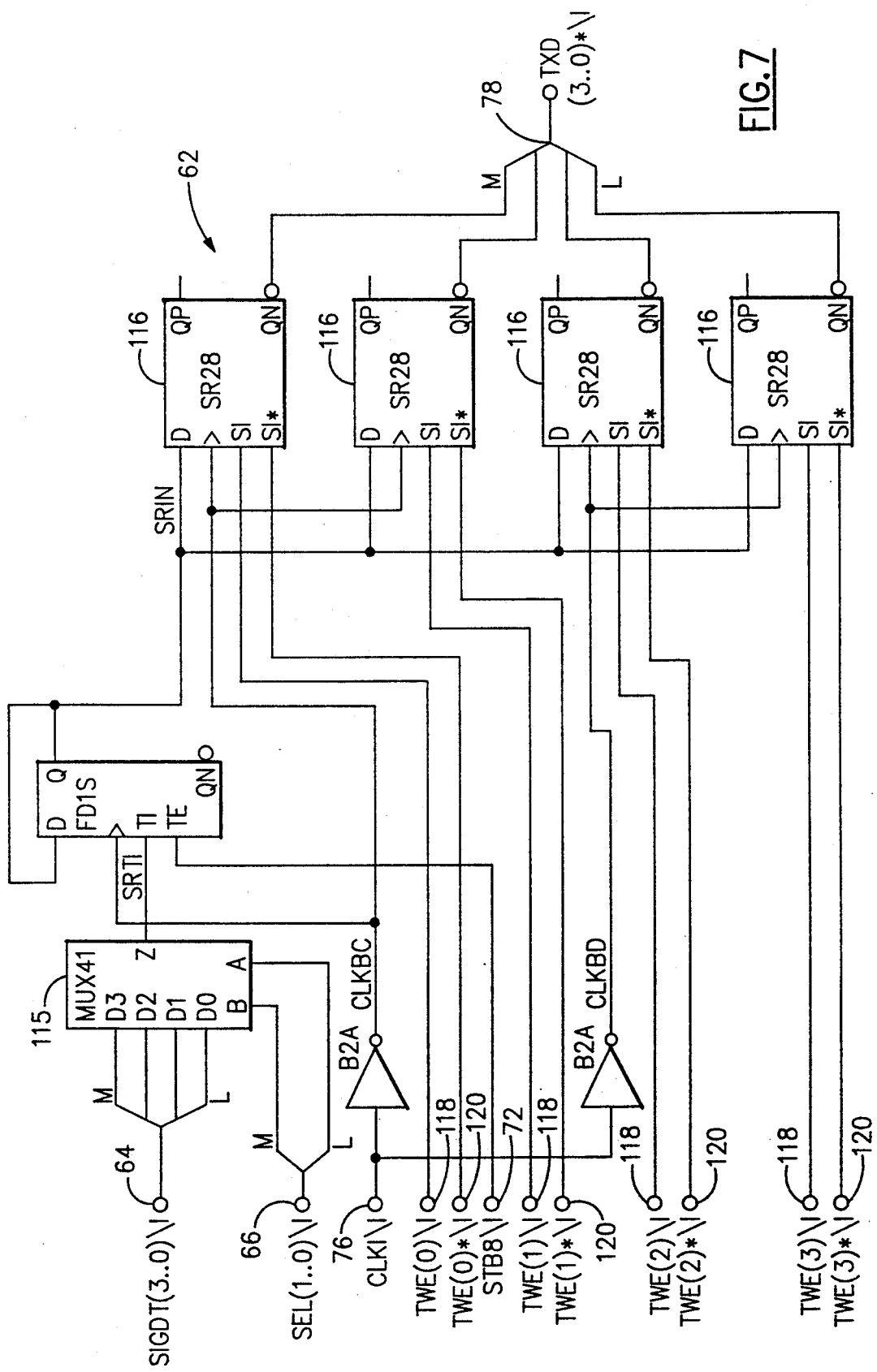
FIG. 7 is a schematic diagram of a signal memory circuit.

Referring to FIG. 7, there is shown a schematic diagram of the signaling memory circuit 62. The signaling memory circuit includes a multiplexer 115 and four 28-bit shift registers 116 for storing 28 signaling bits each corresponding to the signaling for 28 tributaries.

Figure 11:
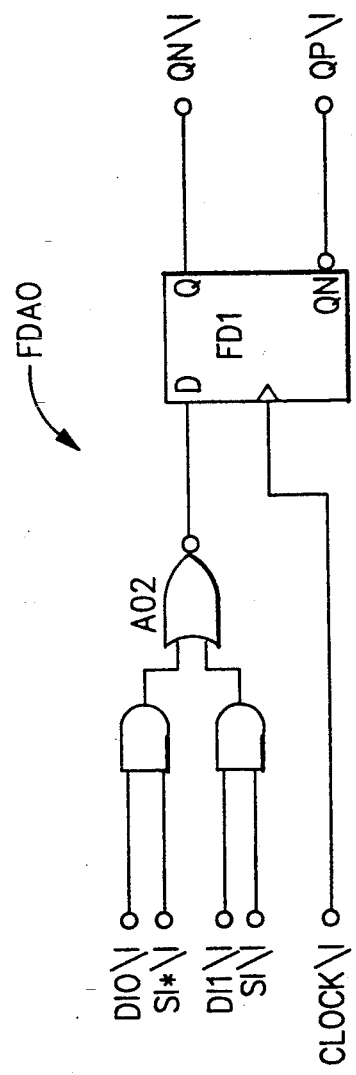
FIG. 11 is a schematic diagram of a flip-flop used in the shift register of FIG. 8.
Figures 8, 8A:
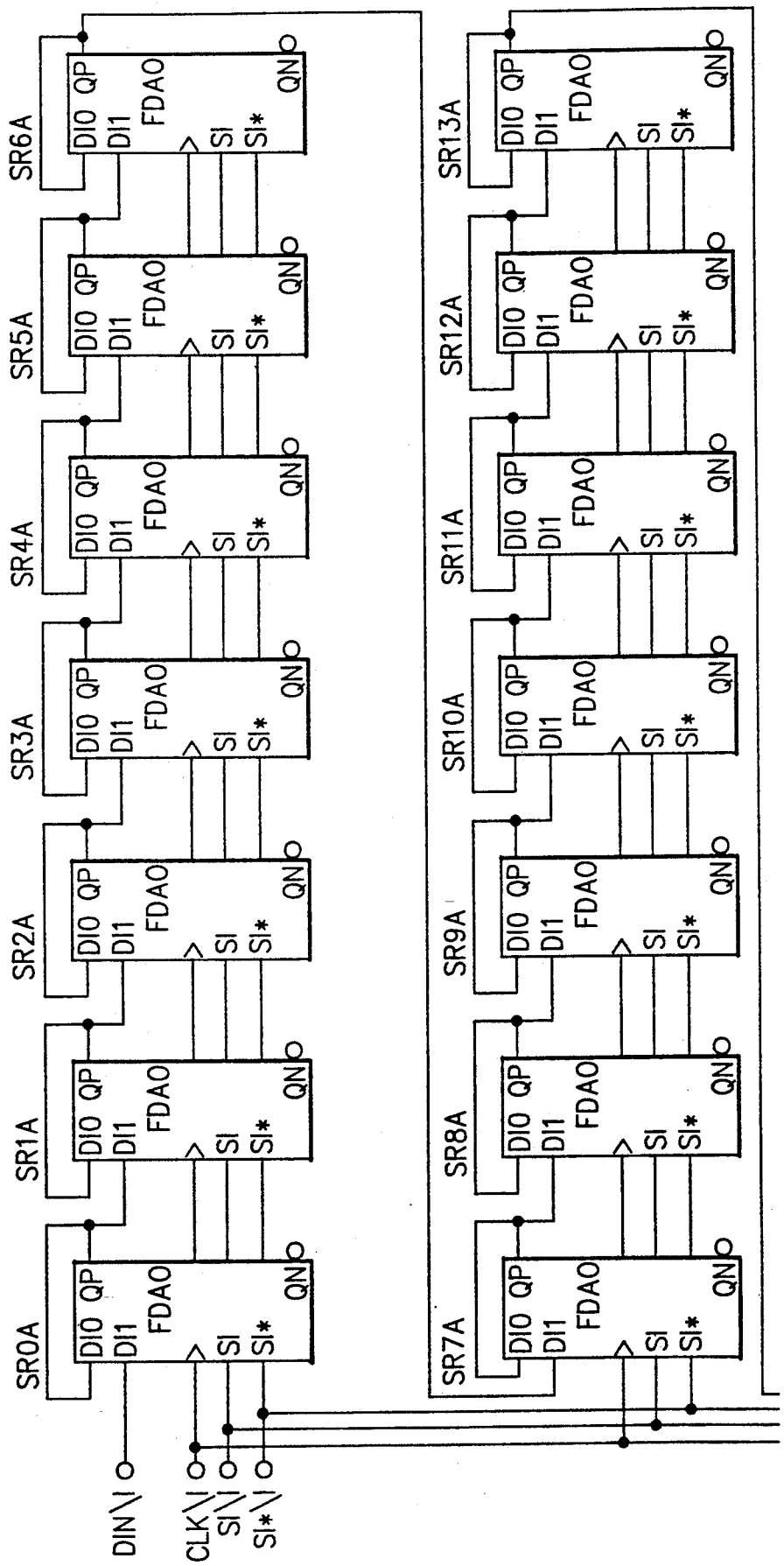
FIG. 8, comprising
FIGS. 8A and 8B, is a schematic diagram of a 28-bit shift register used in the signal memory of FIG. 7.
Figure 8B:
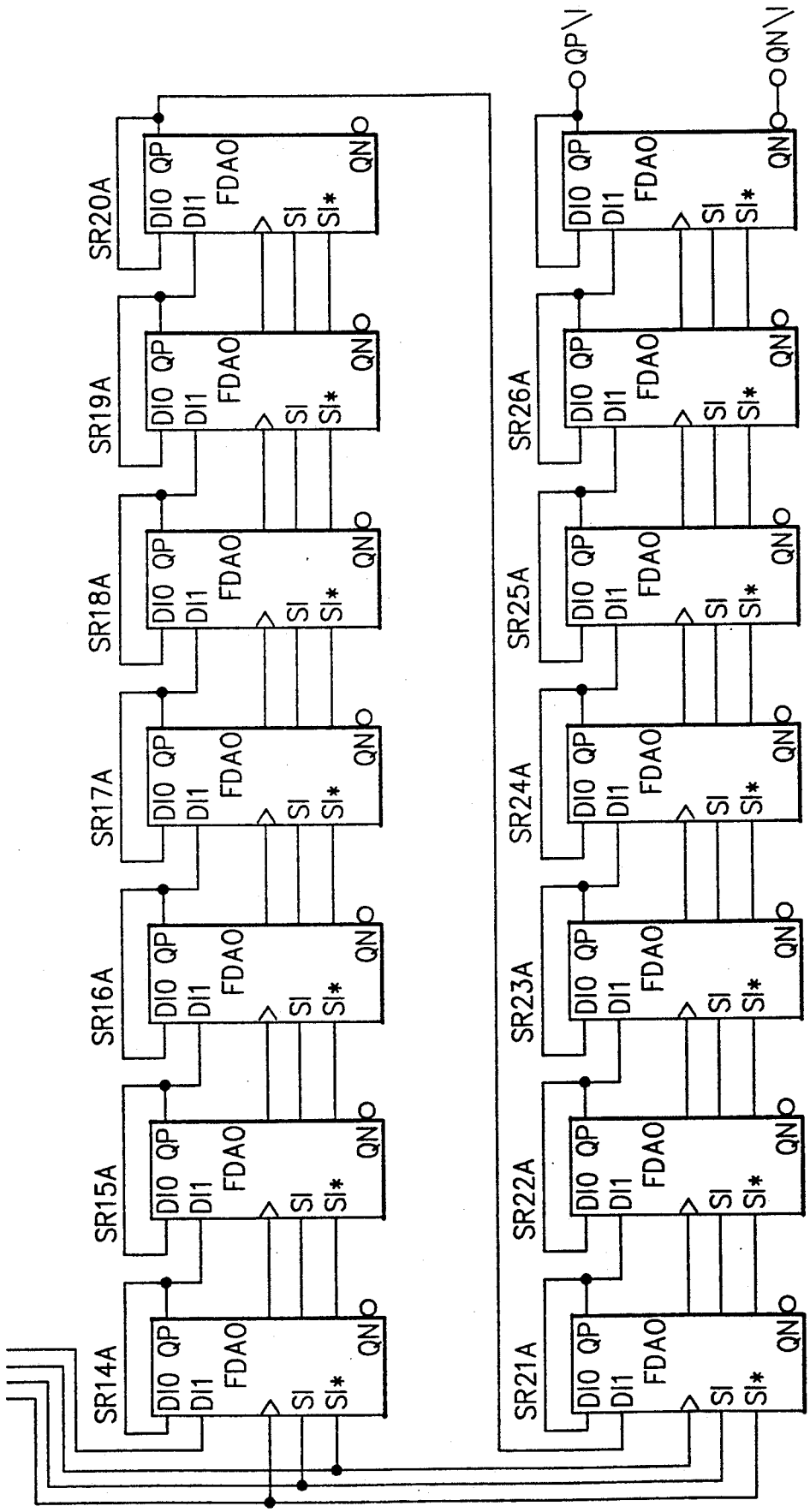

FIG. 8 shows a schematic diagram of a shift register 116, wherein 28 flip-flops are used for storing and shifting the 28 signaling bits. FIG. 11 shows the construction of each of the flip-flops shown in FIG. 8.

In FIG. 7, terminals 118 are connected to input 68 of the signal memory circuit 62 shown in FIG. 5 and receive a shift signal for an SI input of each of the shift registers 116. In like manner, terminals 120 are connected to input 70 shown in FIG. 5 and receive inverted shift signals for input SI* on each of the shift registers 116. The four 28-bit shift registers 116 store the 112 bits of signaling information that are to be transmitted in an SPE of a SONET frame. Each shift register stores the same channel signaling bit for 28 tributaries, i.e., for a particular SONET frame, one register will store all of the A bits for channels 0. The four register outputs provided at 78 correspond to the S1-S4 bits of the SONET signaling byte and also the signaling bits illustrated in FIG. 3. The multiplexer 115 is used to select one of the A, B, C and D signaling bits provided at its inputs, in accordance with the bits provided at input 66, which identify which phase of the 24-frame SONET superframe is being transmitted. The setting of the multiplexer 115 remains the same for six SONET frames. The frame number and signaling bit relationship that exists during the loading of the shift registers is shown in Table 2.

The selected signaling bit is presented to the inputs of all four shift registers, but the signaling bit is loaded only into one of the shift registers, which receives a shift signal from a terminal 118. As the signaling bits for four sequential channels are presented at input 64, the selected bit is shifted into registers 116 in a sequential manner such that during frame 23 the A signaling bit for channels 0-3 will be shifted sequentially into one of each of the shift registers 116, as illustrated in Table 2.

During the SONET signaling row, all four registers are activated so that the signaling bits are shifted out to be written into the SONET frame for each successive tributary. The signaling read sequence from the registers is shown in Table 3.

TABLE 2

| TX signaling memory write sequence | | |
|---|---|---|
| Frame | Data Bit | Tributary No |
| 0 | A4-A7 | 0-27 |
| 1 | A8-A11 | 0-27 |
| 2 | A12-A15 | 0-27 |
| 3 | A16-A19 | 0-27 |
| 4 | A20-A23 | 0-27 |
| 5 | B0-B3 | 0-27 |
| 6 | B4-B7 | 0-27 |
| 7 | B8-B11 | 0-27 |
| 8 | B12-B15 | 0-27 |
| 9 | B16-B19 | 0-27 |
| 10 | B20-B23 | 0-27 |
| 11 | C0-C3 | 0-27 |
| 12 | C4-C7 | 0-27 |
| 13 | C8-C11 | 0-27 |
| 14 | C12-C15 | 0-27 |
| 15 | C16-C19 | 0-27 |
| 16 | C20-C23 | 0-27 |
| 17 | D0-D3 | 0-27 |
| 18 | D4-D7 | 0-27 |
| 19 | D8-D11 | 0-27 |
| 20 | D12-D15 | 0-27 |
| 21 | D16-D19 | 0-27 |
| 22 | D20-D23 | 0-27 |
| 23 | A0-A3 | 0-27 |

TABLE 3

| TX signaling memory read sequence | | |
|---|---|---|
| Frame | Data Bits | Tributary No |
| 0 | A0-A3 | 0-27 |
| 1 | A4-A7 | 0-27 |
| 2 | A8-A11 | 0-27 |
| 3 | A12-A15 | 0-27 |
| 4 | A16-A19 | 0-27 |
| 5 | A20-A23 | 0-27 |
| 6 | B0-B3 | 0-27 |
| 7 | B4-B7 | 0-27 |
| 8 | B8-B11 | 0-27 |
| 9 | B12-B15 | 0-27 |
| 10 | B16-B19 | 0-27 |
| 11 | B20-B23 | 0-27 |
| 12 | C0-C4 | 0-27 |
| 13 | C4-C7 | 0-27 |
| 14 | C8-C11 | 0-27 |
| 15 | C12-C15 | 0-27 |
| 16 | C16-C19 | 0-27 |
| 17 | C20-C23 | 0-27 |
| 18 | D0-D3 | 0-27 |
| 19 | D4-D7 | 0-27 |
| 20 | D8-D11 | 0-27 |
| 21 | D12-D15 | 0-27 |
| 22 | D16-D19 | 0-27 |
| 23 | D20-D23 | 0-27 |

Figure 9A:
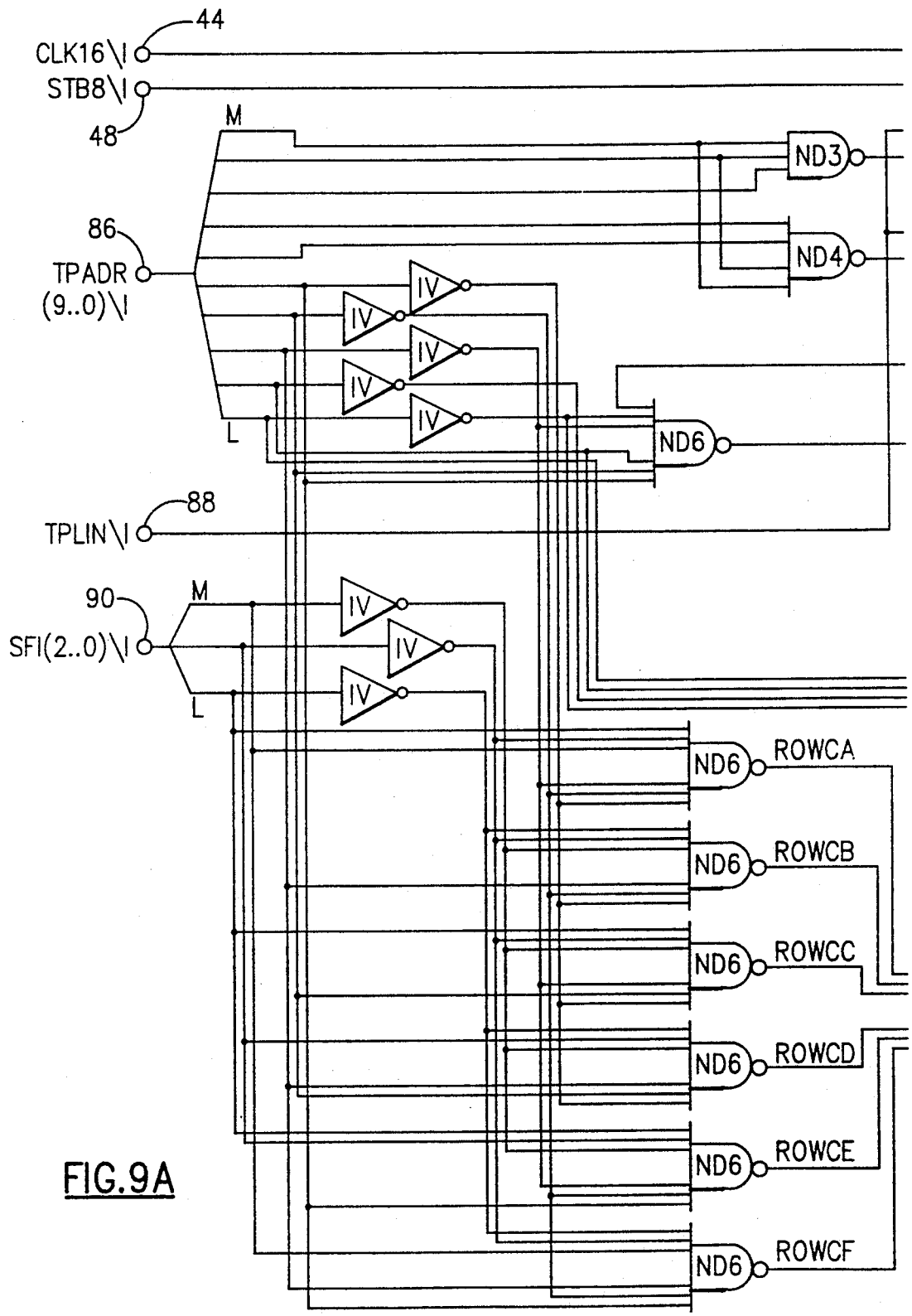

Referring to FIG. 9, there is shown a schematic diagram for the signal memory decoder circuit 80, wherein the load signals for the shift registers are generated in relation to the channel and signaling byte addresses.

During the shifting of data into the shift registers, each shift register must be loaded from a different channel of a four-channel sequence, as previously discussed in regard to Table 2. All the registers are strobed during the signaling row to read out the data to the SONET frame.

The signal memory decoder 80 receives the standard 16 MHz and 8 MHz clock signals, but in addition receives at input 86 ten bits representing byte address of the SPE. Input 88 receives an indication that the payload portion of a SONET frame is being transmitted, and input 90 receives bits 0, 4 and 5 of the H4 path overhead byte, which data can provide an indication as to which of the four channels is presently being shifted into the registers. In response to these signals, four register shift control signals are provided at outputs 122 which are connected to inputs 118 of the signal memory circuit 62 shown in FIG. 7, while the inverse of the register shift control signals are provided at outputs 124 and are connected to inputs 120 shown in FIG. 7.

Figure 10:
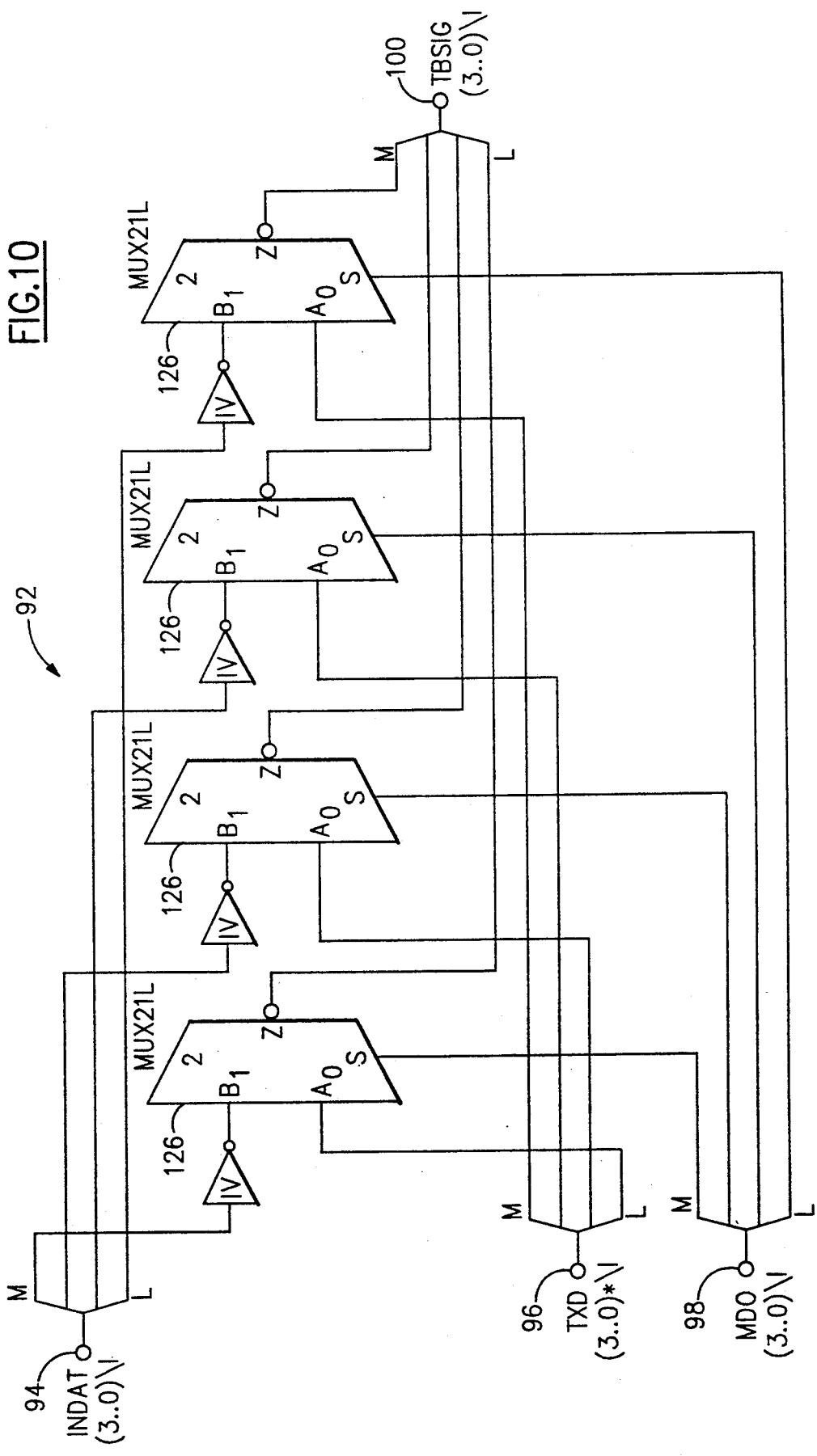
FIG. 10 is a schematic diagram of an output multiplexer.

Referring to FIG. 10, there is shown a schematic diagram of the output multiplexer 92 which includes four 2:1 multiplexers 126, each receiving at one input one bit of the four bits provided at input 94 from the SONET signaling bytes of the through channels. A second input of each multiplexer receives a signaling bit from terminal 96 which receives the four signaling bits from the signal memory 62 which represents the signaling for the added channels. The multiplexers 126 each have a control input connected to input 98 for receiving the data outputted from RAM 20 indicating whether a particular channel is an add channel or a through channel. Multiplexers 126, in response to the control input signal, select either the through signaling bits or the add signaling bits and output those bits to an output bus 100 for insertion into the SONET frame.

Thus, the present invention provides a SONET transmit signaling translator for translating channel-associated signaling bits into SONET-formatted signaling. The translator is adaptable for use in either a terminal multiplexer or an add-drop multiplexer, where only certain channels of the SONET transmission line are inserted. A RAM is provisioned by a control processor to identify channels added by an add-drop multiplexer, which information is used to control an output multiplexer to multiplex signaling of through channels with signaling of add channels, to provide signaling for the SONET format.

What is claimed is:

1. A device for interfacing a high-frequency SONET-formatted carrier, of the type that transmits information in channels associated with tributaries, with a lower bandwidth carrier, of the type that transmits information in lower-level transmission channels, said device including:
   means for receiving signaling bits from said lower-level transmission channels of the lower bandwidth carrier; and
   means for translating said received signaling bits from said lower-level transmission channels into SONET-formatted signaling bits.

2. A device for interfacing a high-frequency SONET-formatted carrier of the type that transmits information in channels associated with tributaries, with a lower bandwidth carrier, said device including:

means for translating signaling bits associated with lower level transmission channels into SONET-formatted signaling bits;

means for receiving SONET-formatted signaling bits from said high-frequency SONET-formatted carrier; and means for selecting, for each channel of said channels associated with tributaries, SONET-formatted signaling bits from either said means for translating or said means for receiving, and for outputting the selected SONET-formatted signaling bits.

3. A device as described in claim 2, wherein the means for selecting comprises:

a multiplexer having inputs for receiving signaling bits from said means for translating and from said means for receiving, an output for providing SONET-formatted signaling bits, and a control input; and means for providing control signals to the control input of the multiplexer, whereby the multiplexer outputs SONET-formatted signaling bits in accordance with the control signals.

4. A device as described in claim 3, wherein the means for providing control signals comprises a microprocessor provisioned memory means for storing data, for each channel associated with tributaries, indicative of whether information in a each such channel is interfaced with a lower bandwidth carrier.

5. A SONET access product wherein selected ones of received SONET channels are passed through the access product while other SONET channels are added from lower-level transmission systems by the access product and channel-associated signaling of the added channels is rearranged into SONET-formatted signaling, said access product comprising:

means for rearranging channel-associated signaling into SONET-formatted signaling for all lower-level transmission channels connected to said access product;

means for receiving all SONET-formatted signaling for all SONET channels received by said access product;

an output for SONET-formatted signaling for all SONET channels;

multiplexing means connected to receive SONET-formatted signaling from said means for rearranging and connected to receive SONET-formatted signaling from said means for receiving all SONET-formatted signaling and for providing at an output a selected one of said SONET-formatted signaling for each channel of the SONET channels in response to a control signal; and means for providing a control signal to said multiplexing means for each SONET channel indicating whether the SONET channel is a passed through channel or an added channel.

6. A SONET access product as described in claim 5, wherein the means for providing a control signal comprises:

a channel mapped memory for storing one bit of data for each SONET channel to indicate whether it is a through channel or an added channel, and for providing said control signal to said multiplexer for each SONET channel in accordance with the stored data.

7. A device for interfacing a high-frequency SONET-formatted carrier, of the type that transmits information in channels associated with tributaries, with a lower bandwidth carrier, of the type that transmits information in lower-level transmission channels, said device including:

means for receiving signaling bits from said lower-level transmission channels of the lower bandwidth carrier;

means for selectively reading a type of said signaling bits from sequential channels of said lower level transmission channels;

a plurality of shift registers, each for storing bits of the selected type of signaling bit for a predetermined one of said channels, associated with tributaries, for each tributary of the SONET-formatted carrier;

means for writing the bits of the selected type of signaling bit for each predetermined channel sequentially into the shift registers;

a plurality of parallel outputs; and means for reading out said shift registers to said plurality of parallel outputs, whereby each output sequentially provides signaling bits of the selected type for one of said predetermined channels associated with tributaries, one bit for each tributary for transmission in a frame of SONET-formatted signaling bits, whereby said received signaling bits from said lower-level transmission channels are translated into SONET-formatted signaling bits.

8. A device as described in claim 7, wherein the lower-level transmission provides four different types of signaling bits for each of said lower-level transmission channels and said means for selectively reading selects one of said four types of signaling bits, and said plurality of shift registers are provided for storing bits of the selected type of signaling bit for a like plurality of sequential channels of said lower-level transmission channels, whereby four signaling bits of the selected type for said four sequential channels are simultaneously outputted for one of said tributaries, with the signaling bits for each tributary being provided sequentially.

9. A device as described in claim 7, additionally comprising:

a plurality of parallel inputs;

means for receiving on said parallel inputs SONET-formatted signaling bits from said high-frequency SONET-formatted carrier; and means for selectively providing to said parallel outputs signaling bits selected from bits stored in said shift registers and bits received on said parallel inputs, whereby said parallel outputs selectively provide signaling bits for channels associated with tributaries, that are not to be interfaced with the lower bandwidth carrier and signaling bits for the lower-level transmission channels.

10. A device as described in claim 9, wherein said means for selectively providing comprises:

a multiplexer having inputs for receiving signaling bits stored in said shift registers and signaling bits from said receiving means on said parallel inputs said multiplexer also having an output; and means for selectively controlling said multiplexer, whereby the multiplexer outputs the selected signaling bits.

11. A device as described in claim 10, wherein said means for selectively controlling said multiplexer comprises:

a memory means for storing data, for each channel associated with tributaries, indicative of whether each such channel is interfaced with the lower bandwidth carrier.

12. A device as described in claim 11, additionally comprising:

means for addressing said memory means so that the memory means outputs the data for the predetermined one of said channels associated with tributaries for each tributary.

13. A device as described in claim 12, additionally comprising:

means for writing said data to said memory means, said means for writing data being microprocessor controlled.

* * * * *